March 8, 1927.  C. W. FREDERICK ET AL  1,620,339
PROJECTION OBJECTIVE
Filed May 20, 1926
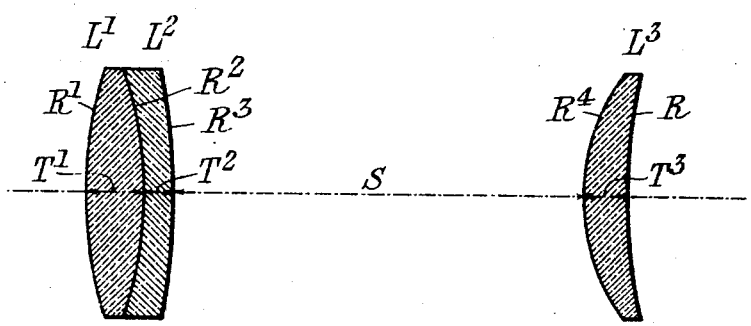
| Lens | Radii | Thickness & Separation | D Line | V |
|---|---|---|---|---|
| $L^1$ | $R^1$ = 82.8 | $T^1$ = 9.4 | 1.523 | 59.0 |
|  | $R^2$ = 69.2 |  |  |  |
| $L^2$ | $R^3$ = 601.9 | $T^2$ = 3.8 | 1.617 | 36.4 |
|  | $R^4$ = 40.7 |  |  |  |
|  |  | S = 96.7 |  |  |
| $L^3$ | R = 220.7 | $T^3$ = 8.0 | 1.523 | 59.0 |
Charles W. Frederick & Donald L. Wood,
INVENTORS,
BY
ATTORNEYS.

Patented Mar. 8, 1927.

1,620,339

UNITED STATES PATENT OFFICE.

CHARLES W. FREDERICK AND DONALD L. WOOD, OF ROCHESTER, NEW YORK, ASSIGNORS TO EASTMAN KODAK COMPANY, OF ROCHESTER, NEW YORK, A CORPORATION OF NEW YORK.

PROJECTION OBJECTIVE.

Application filed May 20, 1926. Serial No. 110,533.

This invention relates to an objective for projection purposes and particularly to such an objective designed for use in small and inexpensive projectors intended for home and amateur use.

Expense is obviously a much greater consideration in the design of equipments for such use than for professional use. It is necessary not only that the objective itself shall be inexpensive, but also that it will be of wide aperture in order that the lamp and lamp-house may be likewise small and compact and as inexpensive as possible. The limitations in size as to these necessarily limits the candle power of the light source, which is thus practically limited to an incandescent lamp of small size. The users are, however, accustomed to view public motion picture exhibitions where the quality and illumination of the projected image are as good as can be obtained with equipment where expense and compactness are not limiting factors.

The desiderata of an objective for amateur projection purposes are thus inexpensiveness, wide aperture and a reasonably high degree of correction.

We have attained these apparently contradictory requirements to a very satisfactory degree, in an objective of the type disclosed on the accompanying drawing. This objective consists of two separated components, the rear one of which, that is the one nearer the film gate, is a positive meniscus with the concave side facing the gate. This is placed very close to the gate, or in other words, the objective has a very short back focal length. By reason of the shape and position of the rear element, most of the rays in the beam from the gate are collected thereby, and so refracted as to be included within a beam directed through the front component, which is a simple cemented combination, separated from the rear component by a distance nearly as great as the equivalent focal length of the objective.

The following points, all making for cheapness in manufacture, are to be noted. The objective consists of but three elements. But two kinds of glass are used, and these are both inexpensive. None of the curves are steep, the greatest curvature being on a radius at least forty percent of the equivalent focal length of the objective.

The data for the preferred form is given in the following table, most of which appears also on the drawing. The three lenses are designated successively $L^1$, $L^2$ and $L^3$; the radii of curvature $R^1$ to $R^5$ successively; the thicknesses $T^1$ to $T^3$; and the separation between the components S. The refraction is given for the D line and the $G^1$ line and the value of the dispersive ratio, $\nu$, is given. The table, as given, is for an objective having an aperture of $f/2.5$, an equivalent focal length of 100, and a back focal length of 31.3. The glasses used are in common use and are known as white optical crown and dense flint.

| Lens. | Focal length. | Radii. | Thicknesses and separation. | Glass. | | |
|---|---|---|---|---|---|---|
| | | | | D. | $G'$. | $\nu$. |
| $L^1$ | +73.6 | $R^1$= 82.8 | $T^1$= 9.4 | 1.523 | 1.534 | 59.0 |
| $L^2$ | −127.1 | $R^2$= 69.2 | $T^2$= 3.8 | 1.617 | 1.639 | 36.4 |
| | | $R^3$=601.9 | S=96.7 | | | |
| $L^3$ | +94.0 | $R^4$= 40.7 | $T^3$= 8.0 | 1.523 | 1.534 | 59.0 |
| | | $R^5$=220.7 | | | | |

The focal length of the combined front component is 167.0.

Having thus described our invention, what we claim as new and desire to secure by Letters Patent is:

1. An objective comprising a positive front component consisting of a positive lens of crown glass and a negative lens of flint glass cemented together and a rear component consisting of a positive meniscus lens of crown glass with the convex surface facing the front component.

2. An objective comprising a positive front component consisting of a positive lens of crown glass and a negative lens of flint glass cemented together and a rear component consisting of a positive meniscus lens of crown glass with the convex surface facing the front component, the axial separation of the components being greater than ninety percent of the focal length of the objective.

3. A projection objective comprising a biconvex component consisting of a positive lens and a negative lens cemented together and a component consisting of a positive meniscus lens with the convex surface facing the first named component.

4. An objective comprising a positive component consisting of a positive lens and a negative lens cemented together and a component consisting of a positive meniscus lens with the convex surface facing the first named component, the two positive lenses being of the same optical crown glass and the negative lens being of dense flint and each radius of curvature being at least forty percent of the focal length of the objective.

5. A projection objective having an aperture greater than $f/3$ and comprising two separated components, the front component comprising a biconvex compound element consisting of a positive lens of optical crown glass and a negative lens of dense flint glass cemented together, and the rear component consisting of a single, positive meniscus lens of optical crown glass with its convex surface in front, each radius of curvature in the objective being greater than thirty-five percent of the focal length of the objective.

6. A projection objective having an aperture greater than $f/3$ and comprising two positive components axially separated by a distance greater than ninety percent of the focal length of the objective, the front component comprising a biconvex lens and a negative meniscus lens cemented together with the positive lens in front and the rear component comprising a positive meniscus lens with its convex surface in front, the radius of curvature of each surface in the objective being greater than forty percent of the focal length of the objective, the two positive lenses being composed of the same optical crown glass and the negative lens being of dense flint glass.

Signed at Rochester, New York this 17th day of May, 1926.

CHARLES W. FREDERICK.
DONALD L. WOOD.